United States Patent [19]

Vasiliev et al.

[11] Patent Number: 4,689,021

[45] Date of Patent: Aug. 25, 1987

[54] SPARK TRAINER FOR WELDERS

[75] Inventors: Vsevolod V. Vasiliev; Sergei N. Danilyak; Anna I. Levina; Valery A. Nushko; Jury P. Roiko, all of Kiev, U.S.S.R.

[73] Assignee: Institute Problem Modelirovaniya v Energetike an UKR.SSR, Kiev, U.S.S.R.

[21] Appl. No.: 918,849

[22] Filed: Oct. 14, 1986

[51] Int. Cl.[4] ............................................. G09B 19/24
[52] U.S. Cl. ..................................................... 434/234
[58] Field of Search ......................................... 434/234

[56] References Cited

U.S. PATENT DOCUMENTS

| | | | |
|---|---|---|---|
| 3,867,769 | 2/1975 | Schow et al. | 434/234 |
| 4,124,944 | 11/1978 | Blair | 434/234 |
| 4,132,014 | 1/1979 | Schow | 434/234 |

FOREIGN PATENT DOCUMENTS 109278  9/1975  German Democratic Rep. .

OTHER PUBLICATIONS

"Apparatus for Training Welders," V. P. Lugin et al., Svarochnoe Proizvodstvo, Moscow, No. 9, pp. 50–51.

Primary Examiner—William H. Grieb
Attorney, Agent, or Firm—Fleit, Jacobson, Cohn & Price

[57] ABSTRACT

A spark trainer for welders comprises a welding electrode simulator, an electric spark generator connected to the electrode simulator, a welding object simulation unit, a spark discharge being produced between said welding object simulation unit and the tip of the welding electrode simulator in order to simulate the welding arc, a unit for monitoring the position of the tip of the electrode simulator in relation to the simulated welding object, a welding process control unit having its input connected to the electrode simulator tip position monitoring unit, electric spark generator, and a helmet with earphones.

17 Claims, 14 Drawing Figures

SPARK TRAINER FOR WELDERS

FIELD OF THE INVENTION

This invention relates to devices for training in tool handling and, in particular, is concerned with a spark trainer for welders.

The invention can be used as a technical facility for teaching the skills of manual and semiautomatic welding.

BACKGROUND OF THE INVENTION

Known in the art is a welder trainer which comprises a welding electrode simulator featuring a burn-off simulation drive, a high-frequency generator simulating the welding arc, a workpiece model whereon special paper is attached. This trainer is capable of imitating some effects accompanying the welding process, such as light, noise, smoke, and also simulates the movement of the electrode over the workpiece, arc initiation, electrode vibrations (cf., for example, GDR Patent No. 109,278, IPC G 09 B 9/00, 1975, patent holders: Gunther Schütt, Siegfried Wensel).

The disadvantage of this welder trainer consists in that the welder training quality is not adequate due to incomplete involvement of physical factors of the welding process. Moreover, no control over the welding process parameters is provided.

Also known in the art is a trainer for welders, which comprises an electric spark generator, and a welding electrode simulator equipped with a holder and a motor drive to simulate the electrode burning-off during welding.

The training device also comprises a workpiece simulating unit on which a sheet of paper, conventional or electrographic, is secured. A spark discharge simulating the welding arc is generated between the workpiece simulating unit and the tip of the welding electrode simulator. This spark discharge is used to trace the path of the electrode tip. The training device also comprises a pulse counter whose readings are used to monitor the simulated welding process and record how many times the arc gap between the electrode and workpiece has been interrupted or exceeded in relation to the specified length. The control unit is connected, via the electric spark generator, with the welding electrode simulator. Also connected to the control unit is a headset which produces audible signals indicative of the correctness of the welder's manipulations.

This technical solution (cf., for example, V. P. Lugin, V. A. Kuzmichev, Apparatus for Training Welders, Svarochnoe Proizvodstvo, Moscow, No. 9, pp. 50–51) was adopted as the prior art device of the present invention.

This prior art training device is deficient in that it can only be used to train welders in a limited number of welding operations. The device cannot be used for training in welding 3-D workpieces. In addition, the device provides no means for monitoring the arc gap length, the electrode tilt angle, and the welding speed.

The efficiency of training is, therefore, not high. Moreover, there is no optical feedback offered to the trainee by which he can assess his actions in the welding process. This also affects the efficiency of the training process.

SUMMARY OF THE INVENTION

The primary object of the invention is to provide a spark trainer for welders whereby training of welders is made much more efficient.

Another object of the invention is to make simulation of the welding process more adequate.

Yet another object of the invention is to provide training of welders in a broader variety of welding processes.

Still another object of the invention is to provide integrated control of the simulated welding process.

A further object of the invention is to provide more objective monitoring of the training process.

These objects are achieved in that a spark trainer for welders, which comprises a welding electrode simulator, an electric spark generator simulating the welding arc and having the output thereof connected to the welding electrode simulator, a welding object simulation unit, a spark discharge being produced between said welding object simulation unit and the tip of the welding electrode simulator to simulate the welding arc, a training process control unit connected to the welding electrode simulator and the electric spark generator, and a helmet with earphones, which is connected to the control unit to produce audible signals indicative of his actions, according to the invention, also comprises a unit for monitoring the position of the tip of the welding electrode simulator in relation to the simulated welding object, whose outputs are connected to inputs of the control unit.

This provides integrated control of the welder's manipulations and substantially improves the efficiency of training of welders.

Advisably, the unit for monitoring the position of the tip of the welding electrode simulator in relation to the simulated welding object should comprise a welding speed monitoring unit connected to an input of the control unit, a spark gap current length monitoring unit connected to an input of the control unit, a circuit generating a signal corresponding to the simulated welding process, which is connected to an input of the control unit and to an output of the spark gap current length monitoring unit, a unit for monitoring the angle between the welding electrode simulator and the normal to the surface of the simulated welding object, which is connected to an input of the control unit, and a circuit generating a signal corresponding to the time the welding electrode simulator welds on to the surface of the simulated welding object, which is connected to the spark gap current length monitoring unit and to the welding electrode simulator.

This arrangement permits a more adequate simulation of the real welding process.

Suitably, the welding object simulation unit should comprise an operational welding field unit made as a set of metal spokes arranged parallel to the surface of the simulated welding object and rigidly secured on this surface perpendicular to the welding direction, the number of metal spokes being selected on the basis of the size of the simulated welding surfaces and desired accuracy of monitoring of position of the welding electrode simulator tip.

In this manner the welding speed is monitored, which is one welding parameter that had not been monitored at all in any prior art welder trainers.

It is also advisable that the welding speed monitoring unit should comprise a timing pulse oscillator, a register connected to an output of the timing pulse oscillator, and coincidence circuits, each such circuit having its first input connected to a respective output of the register, and its second input electrically connected, via a matching element, to a respective metal spoke of the operational welding field unit, and an OR gate whose inputs are connected to all outputs of the coincidence circuits and whose output is the output of the welding speed monitoring unit.

It is also advantageous that the unit for monitoring the current length of the spark gap should comprise a detector whose input is connected to an output of the electric spark generator, and an error signal generating circuit of the spark gap length, which is connected to an output of the detector.

This unit and its circuitry permit monitoring of another new parameter which had not been monitored before—the length of the spark gap.

Expediently, the circuit generating a signal representing the simulated welding process should be a comparator connected to an output of the spark gap current length monitoring unit, and the unit monitoring the angle between the axis of the welding electrode simulator and the normal to the surface of the simulated welding object should comprise an angle sensor located on the welding electrode simulator, and an angle error signal generating circuit which is a comparator connected to an output of the electrode angle sensor.

The electrode angle control unit permits monitoring of another previously uncontrolled welding parameter—the angle of the electrode simulator.

Profitably, the electric spark generator should comprise, connected in series, a master pulse oscillator and an amplifier whose output is connected to an input of the detector of the spark gap current length monitoring unit.

Advisably, the control unit should comprise a pulse oscillator and, connected thereto, a spark gap length channel connected to an output of the spark gap current length monitoring unit, a welding electrode simulator angle channel connected to the electrode angle monitoring unit, a channel of thermal conditions of the simulated welding process, a simulated welding process speed channel connected to the welding speed monitoring unit, a simulated welding time channel, a circuit controlling the welding electrode burn-off simulation drive, which is connected to an output of the circuit generating a signal representing the simulated welding process and to the welding electrode simulator, a generator of audio alarm signals and welding noise simulation signals, which is connected to the spark gap current length monitoring unit, to the angle monitoring unit, to the welding speed monitoring unit, and to the helmet.

This control unit permits more objective assessment of the trainee's actions.

Advisably, the input of the channel of the simulated welding process thermal conditions should be connected to an output of a circuit generating an error signal indicative of the thermal conditions of the simulated welding process, which is connected to the output of the spark gap current length monitoring unit and to the output of the circuit generating a signal representing the simulated welding process, and which comprises, connected in series, a converter of a signal representing the length of the arc gap, a converter of a signal representing the arc current, a multiplier connected to outputs of both converters, an adder, a switch, an integrator, and a comparator, the second input of the adder being connected to a welding speed setting circuit, while a control input of the switch is connected to an output of the circuit generating a signal representing the simulated welding process.

This circuit generating an error signal indicative of the thermal conditions of the simulated welding process offers the advantage of a more adequate simulation of the real welding process.

In order to produce an optical signal indicative of the welder's action in the process of training, which is generated on the basis of the length of the spark gap, the tilt angle of the welding electrode simulator, and the thermal conditions of the simulated welding process, it is advisable that the welding electrode simulator should be provided with a light source whose light flux is directed to the surface of the simulated welding object and which is electrically connected to an output of the integrator of the thermal condition error signal generating circuit.

It is for the first time that an optical feedback is provided in a spark trainer for welders.

Advisably, the circuit generating a signal representing the weld-on time of the welding electrode simulator should comprise, connected in series, a comparator, and a switching circuit whose output is connected to a winding of an electromagnet installed at the tip of the welding electrode simulator.

BRIEF DESCRIPTION OF THE ACCOMPANYING DRAWINGS

These and other objects of the invention will become more apparent from the following description taken together with the accompanying drawings, wherein.

DETAILED DESCRIPTION OF THE INVENTION

Disclosure is made of a spark trainer for welders, whose distinctive features are simulation of a welding arc by means of a spark discharge and of a welding bath by optical means.

The spark trainer, according to the invention, comprises a welding electrode simulator 1 (FIG. 1), an electric spark generator 2 which simulates a welding arc by a spark discharge and has its output connected to an input 3 of the welding electrode simulator 1.

Figure 1:
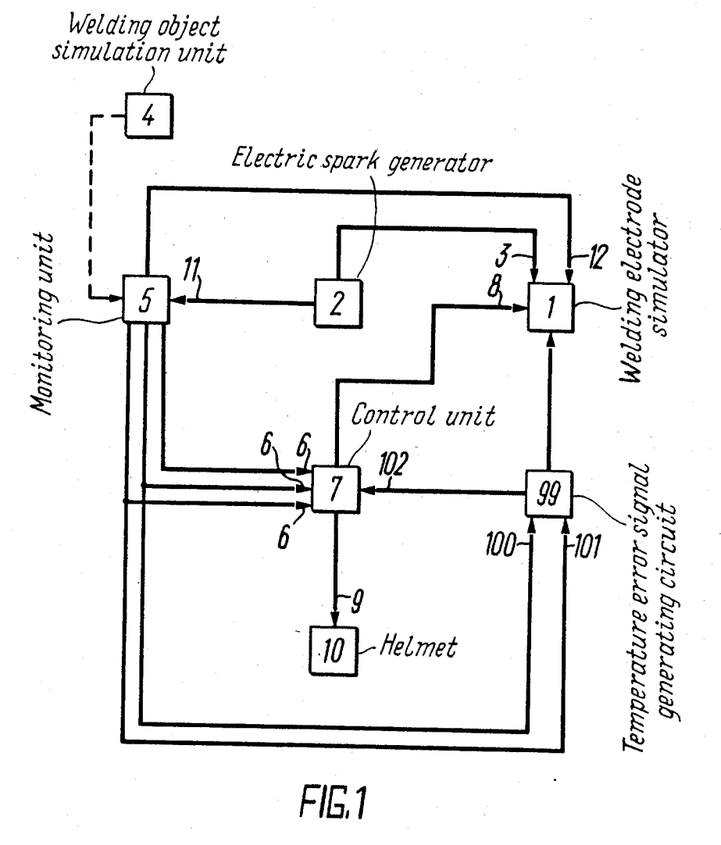
FIG. 1 is a block diagram of a spark trainer for welders, according to the invention.

The spark trainer comprises a welding object simulation unit 4 which is mechanically connected with a unit 5 for monitoring the position of the tip of the welding electrode simulator 1 in relation to the simulated welding object. The unit 5 is connected to an input 6 of a training process control unit 7 which is coupled with an input 8 of the welding electrode simulator 1. The control unit 7 is connected to an input 9 of a helmet 10 equipped with earphones to produce audio signals characterizing the operations the welder is performing during training.

The output of the electric spark generator 2 is connected to an input 11 of the unit 5, while the output of said unit 5 is connected to an input 12 of the welding electrode simulator 1.

The unit 5 for monitoring the position of the tip of the welding electrode simulator 1 comprises a welding speed monitoring unit 13 (FIG. 2), a spark gap current length monitoring unit 14, a circuit 15 generating a signal representing the simulated welding process, a unit 16 monitoring the angle between the axis of the welding electrode simulator 1 and the normal to the surface of the simulated welding object, and a circuit 17 generating a signal representing the weld-on time of the electrode simulator 1 to the surface of the simulated welding object. The output of the spark gap current length monitoring unit 14 is connected to inputs 18 and 19 of the circuits 15 and 17 respectively. The input 11 of the unit 5 is the input of the unit 14. Outputs of the units 13, 14, 16, and of the circuit 15 are connected to the input 6 of the training process control unit 7.

Figure 3:
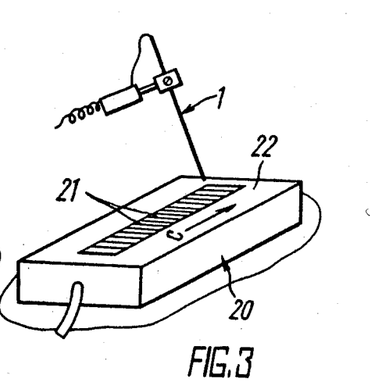
FIG. 3 is a welding object simulation unit, where the welding object is a flat joint, according to the invention.
Figure 4:
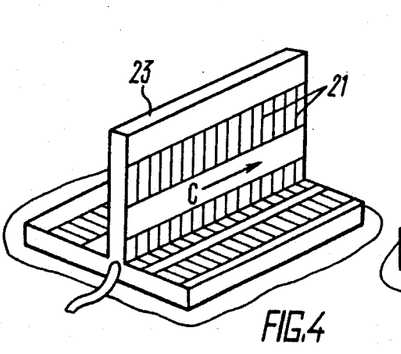
FIG. 4 is a welding object simulation unit, where the welding object is a corner joint, according to the invention.
Figure 5:
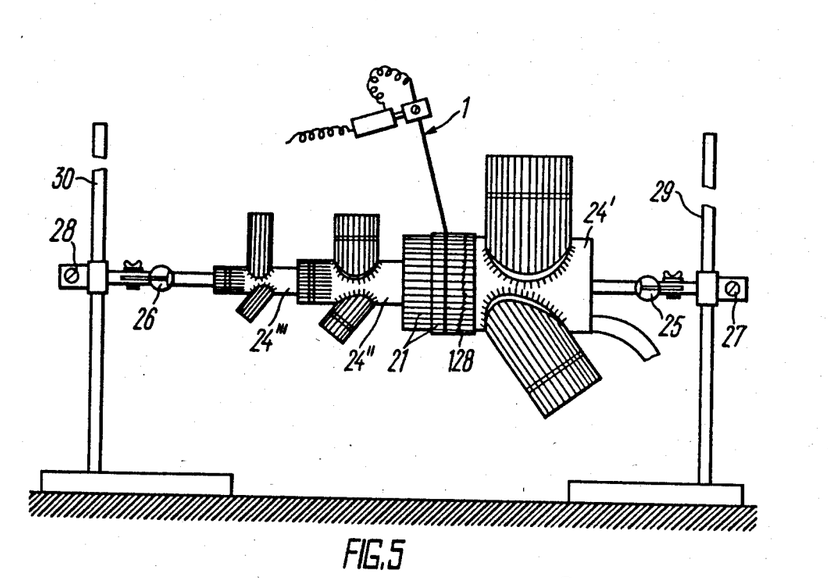
FIG. 5 is a welding object simulation unit, where the welding objects are branch joints of pipes having different diameters, according to the invention.

According to the invention, the welding object simulation unit 4 comprises a foundation made of dielectric material and an operational welding field unit resting on said foundation (FIGS. 3, 4, and 5). The operational welding field unit is a set of metal spokes 21. These spokes 21 are arranged on a flat foundation 20 (FIG. 3) parallel to a surface 22 of the simulated welding object, and are rigidly secured therein perpendicular to the direction of welding, which is indicated by arrow C.

For corner joint welding, the foundation 23 (FIG. 4) is a corner joint whose both surfaces are provided with spokes 21.

For pipe joint welding, the foundation comprises a dielectric multistage pipe 24 having branches $24^I$, $24^{II}$, and $24^{III}$ in each stage, two ball-and-socket joints 25 and 26, two clamps 27 and 28, and two stands 29 and 30. The multistage pipe 24 is installed on the stands 29 and 30 by means of the ball-and-socket joints and clamps 27 and 28 so that its attitude could be adjusted.

The metal spokes 21 in each stage of the pipe 24 are arranged parallel to the pipe axis and interconnected.

The number of metal spokes 21 on any type of foundation is selected on the basis of the size of the simulated surfaces and the desired accuracy of monitoring the position of the tip of the welding electrode simulator 1 (FIG. 1), e.g. not less than a thousand spokes for one meter of the simulated welded seam.

Replaceable sheets (not shown) of conventional or thermosensitive paper are attached into the surface of the welding field unit.

Figure 6:
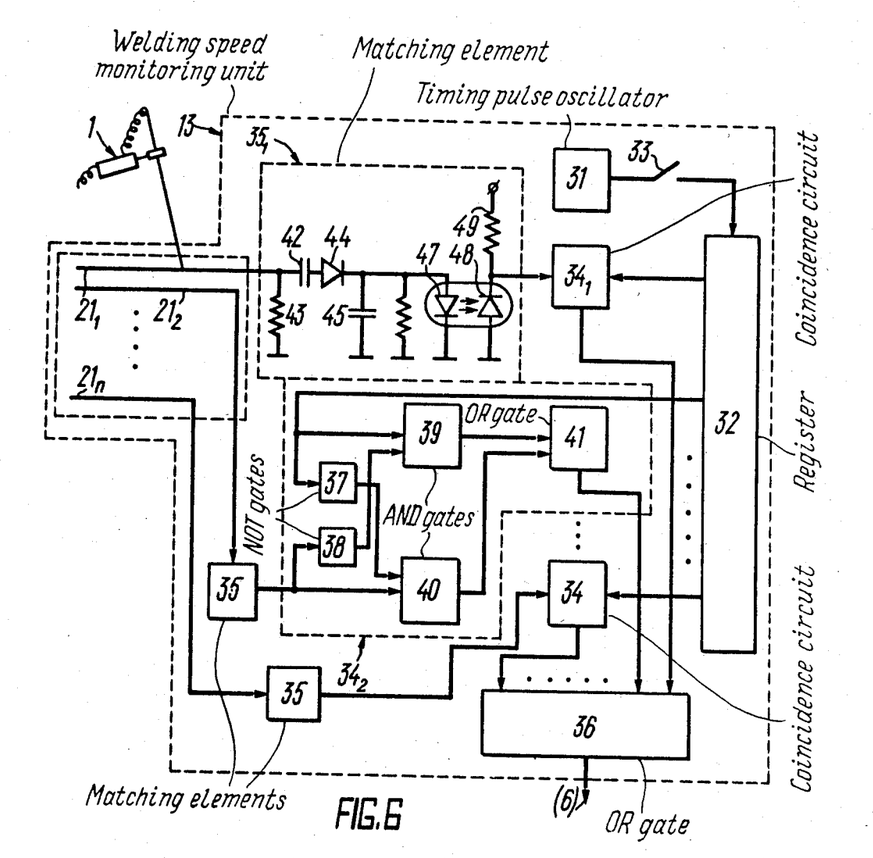
FIG. 6 is a functional block diagram of a welding speed monitoring unit, according to the invention.

Referring to FIG. 6, the functional block diagram shows the welding speed monitoring unit 13 which is designed to monitor how the trainee maintains the desired welding speed in the process of training, and also to generate welding speed error signals. The unit 13 comprises a timing pulse oscillator 31 and a register 32 connected to an output of the oscillator 31 via a switch 33. A respective output of the register 32 is connected to a coincidence circuit 34, another input of each coincidence circuit 34 being electrically connected, via an interface 35, to a respective spoke 21. All outputs of the coincidence circuits 34 are connected to respective inputs of an OR gate 36 whose output is the output of the welding speed monitoring unit 13 and is connected to the input of the control unit 7 (FIG. 1).

The coincidence circuit 34 comprises two NOT gates 37 and 38, and two AND gates 39 and 40, inputs of each said AND gates 39 and 40 being connected to outputs of the NOT gates 37 and 38. Other inputs of the AND gates 39 and 40 are connected to an output of a respective interface 35 and a respective output of the register 32. The coincidence circuit 34 also comprises an OR gate 41 whose inputs are connected to outputs of the AND gates 39 and 40. In order to isolate the high-voltage welding field unit with spokes 21 from the low-voltage inputs of the coincidence circuits 34, each interface 35 comprises an input circuit composed of a capacitor 42 and a resistor 43, a detector built around a diode 44 with a capacitor 45, and a resistor 46. Each interface 35 also has an optoelectronic coupler comprising a light-emitting diode 47, a photodiode 48, and a resistor 49.

The oscillator 31 of timing pulses is designed to generate a continuous sequence of pulses at a frequency of 0.1–10 Hz, which can be steplessly adjusted. The generation frequency of the oscillator 31 sets a specific welding speed.

The register 32 is an n-digit shift register wherein a logical zero is available in only one position, the others being logical 1. Initially, a logical zero is entered to the first position of the register.

The spark gap current length monitoring unit 14 comprises an amplitude detector 50 (FIG. 7), a circuit 51 generating an error signal indicative of the length of the spark gap, which is connected to an output of the detector 50 whose input is connected to the output of the electric spark generator 2 (FIG. 1).

Figure 7:
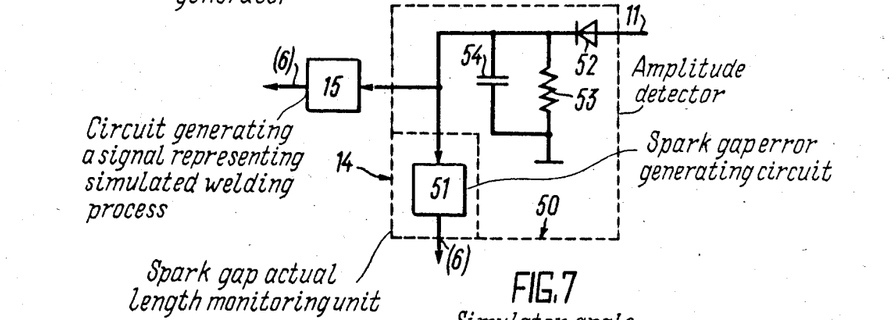
FIG. 7 is a functional block diagram of a spark gap current length monitoring unit, according to the invention.

The amplitude detector 50 is designed to produce a signal representing the length of the spark gap and comprises a diode 52, a resistor 53, and a capacitor 54.

The circuit 51 is an analog comparator.

One of the outputs of the amplitude detector 50 is connected to the input 18 of the circuit 15 generating a signal representing the simulated welding process, which is a comparator designed to produce a signal of spark discharge initiation and extinction.

The unit 16 (FIG. 8) monitoring the angle between the axis of the welding electrode simulator and the normal to the surface of the simulated welding object comprises an angle sensor 55 and a circuit 56 generating an angle error signal, which is a comparator electrically connected to an output of the angle sensor 55.

Figure 9:
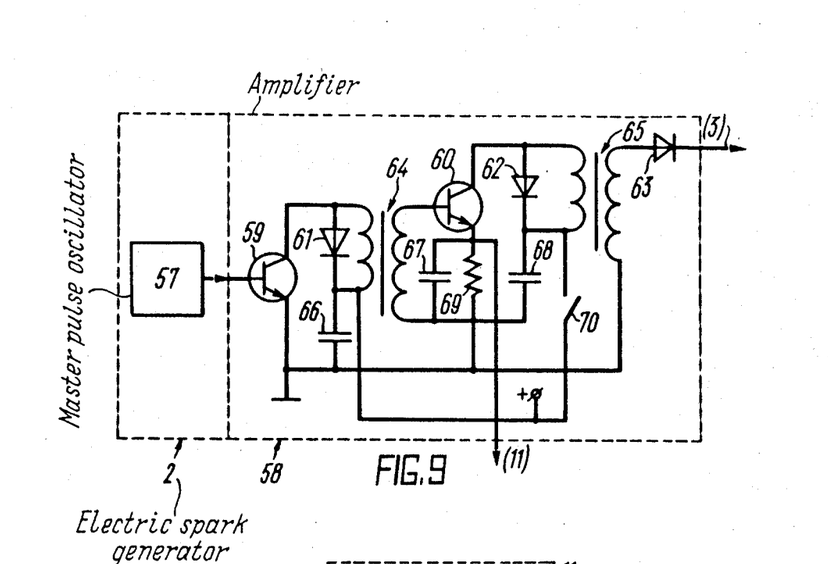
FIG. 9 is a functional block diagram of an electric spark generator, according to the invention.

The electric spark generator 2 whose circuit is shown in FIG. 9 is designed to generate, amplify, and control high-voltage oscillations supplied to the welding electrode simulator 1 (FIG. 1), and also to produce signals representing the length of the spark gap and initiation of the spark discharge. The electric spark generator 2 comprises a master pulse oscillator 57 and an amplifier 58 connected to the oscillator 57 in series. The output of the amplifier 58 is connected to the input 11 (FIGS. 2 and 7) of the unit 5, in particular to the input of the detector 50.

The pulse oscillator 57 is designed to generate a continuous oscillation sequence at a frequency of 10–15 kHz.

The amplifier 58 is designed to amplify the voltage of output signals of the oscillator 57 to a level sufficient for electric spark discharge between the tip of the welding electrode simulator 1 (FIG. 1) and the unit 4, the gap representing the distance between the electrode and workpiece and ranging from 0.5 to 10 mm. The amplifier 58 is built around a circuit of a two-stage transprmer amplifier which comprises transistors 59 and 60, diodes 61, 62, and 63, transformers 64 and 65, capacitors 66, 67, and 68, a resistor 69, and a switch 70.

Figure 10:
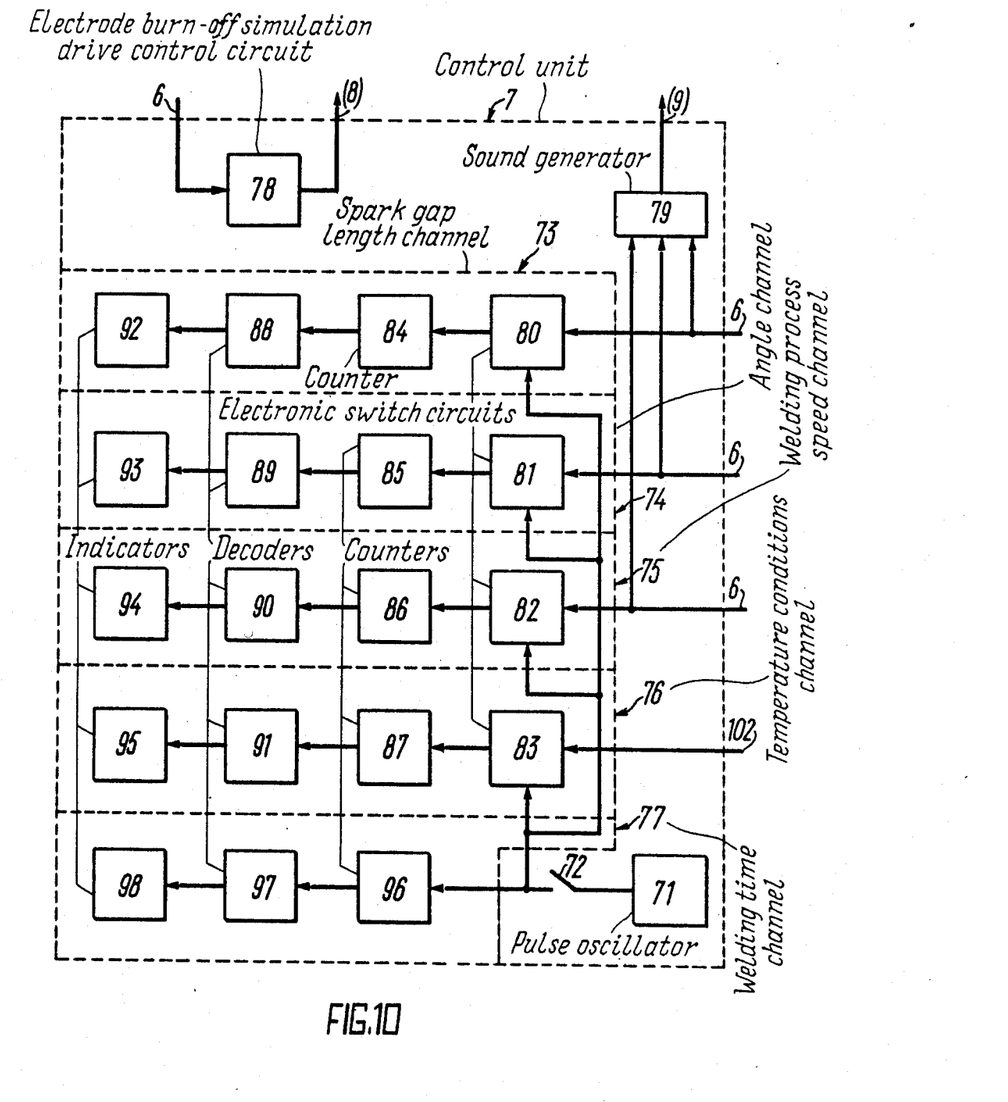
FIG. 10 is a block diagram of a control unit, according to the invention.

The control unit 7 (FIG. 10) comprises a pulse oscillator 71, a switch 72 connected to an output of the pulse oscillator 71, and several channels, such as a spark gap length channel 73 connected to the output of the unit 14 (FIG. 2), a channel 74 (FIG. 10) of the angle of the welding electrode simulator 1, which is connected to the unit 16 (FIG. 2) a simulated welding process speed channel 75 (FIG. 10) connected to the output of the unit 13 (FIG. 2), a simulated welding process thermal condition channel 76 (FIG. 10), a simulated welding process duration channel 77 (FIG. 10). The control unit 7 also comprises a circuit 78 (FIG. 10) controlling the welding electrode burn-off simulation drive, which is connected to the output of the circuit 15 (FIG. 2) and to the input 8 (FIG. 1) of the welding electrode simulator 1, and a sound generator 79 (FIG. 10) producing alarm signal and welding noise simulation signal. Outputs of the sound generator 79 is connected with the unit 14 (FIG. 2), the unit 16, and the unit 13, whose output is connected to the input 9 (FIG. 1) of the helmet 10.

Channels 73 (FIG. 10), 74, 75, and 76 are identically designed, each channel comprises the following series-connected components: an electronic switching circuit 80, 81, 82, or 83, an error counter 84, 85, 86, or 87, an error number decoder 88, 89, 90, or 91, and an error number indicator 92, 93, 94, or 95.

The channel 77 comprises the following series-connected components: a welding time counter 96, a welding time decoder 97, and a welding time indicator 98.

The pulse oscillator 71 is designed to generate pulses each second and can use any of the prior art circuits of continuous-wave oscillators.

The circuit 78 for control of the welding electrode burn-off simulation drive is an electronic comparator whose output is connected to a cut-in relay of said drive, which are not shown.

The input of the channel 76 is connected to an output of a circuit 99 (FIG. 1) generating an error signal indicative of the thermal conditions of the simulated welding process, which is designed to realize the solution of the heat balance equation. Since simulation of the welding process in a training device does not require the knowledge of the temperature distribution throughout the volume of the workpieces, we can neglect parabolic partial differential equations and make use of the usual differential equation to define the balance of the input and output heat within a given volume, considering all types of heat transfer, such as heat conduction, convection, radiation, etc. Mathematically, the simplified heat balance can be given by $$(dh/dt) + Dh + (RV - kUT \cdot \eta) \cdot \delta = 0$$

$$U = a + b \cdot l$$

$$T = \psi(U)$$

where:
h—enthalpy of the welding bath;
V—welding speed;
U—arc voltage;
T—arc current;
l—arc gap length;
a, b, D, R, k, and $\eta$—constants depending on the type and conditions of welding, geometrical dimensions and thermal properties of the electrode and workpieces;
$\delta$—signal indicating irregular welding conditions, $\delta = 0$ if conditions are irregular, $\delta = 1$ if welding conditions are regular.

Figure 2:
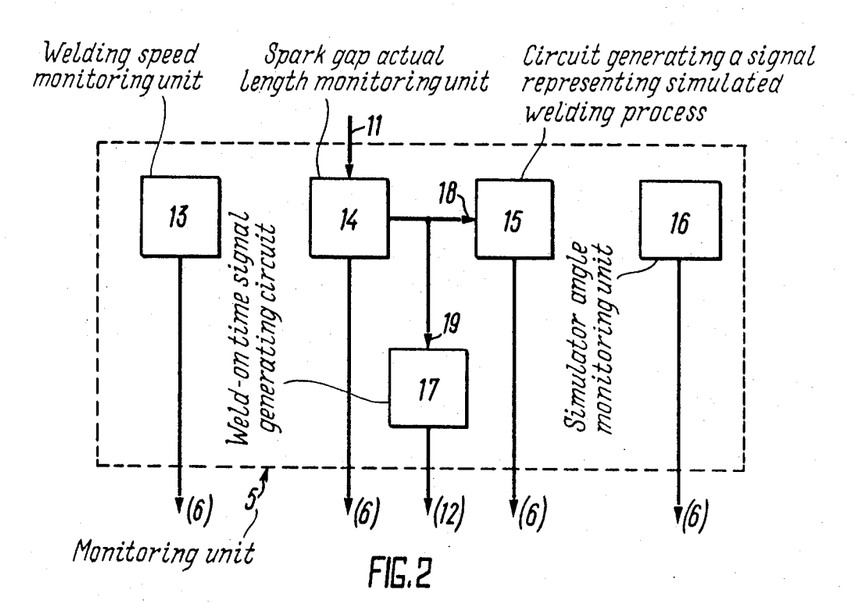
FIG. 2 is a block diagram of a simulator tip position monitoring unit, according to the invention.

The circuit 99 is connected by inputs 100 and 101 thereof to the output of the unit 14 (FIG. 2) and to the output of the circuit 15 respectively. The output signal of the detector 50 (circuit 14 in FIG. 7), which contains information on the current length of the spark gap, is applied to the input 100 of the circuit 99. Outputs of the circuit 99 are connected to the welding electrode simulator 1 (FIG. 1) and an input 102 (FIG. 10) of the channel 76. The circuit 99 comprises, connected in series, a converter 103 (FIG. 11) to generate the signal representing the spark gap length and representing the arc voltage of the actual welding process, a converter 104 of the signal representing the arc current, a multiplier 105 connected to outputs of the converters 103 and 104 which uses the arc current and voltage signals to calculate the arc power signal, an adder 106 to adjust the heat content of the simulated welding bath in accordance with the speed of the simulated welding process, a switch 107, an integrator 108, a comparator 109 that generates an error signal indicative of the heat content of the simulated welding bath. The second input of the adder 106 is connected to the welding speed setting circuit which is a potentiometer 110. The control input of the switch 107 is the input of the circuit 99, and is connected to the output of the circuit 15 (FIG. 2). The switch 107 disconnects the signal of the heat content of the simulated welding bath when the spark discharge is interrupted.

Figure 11:
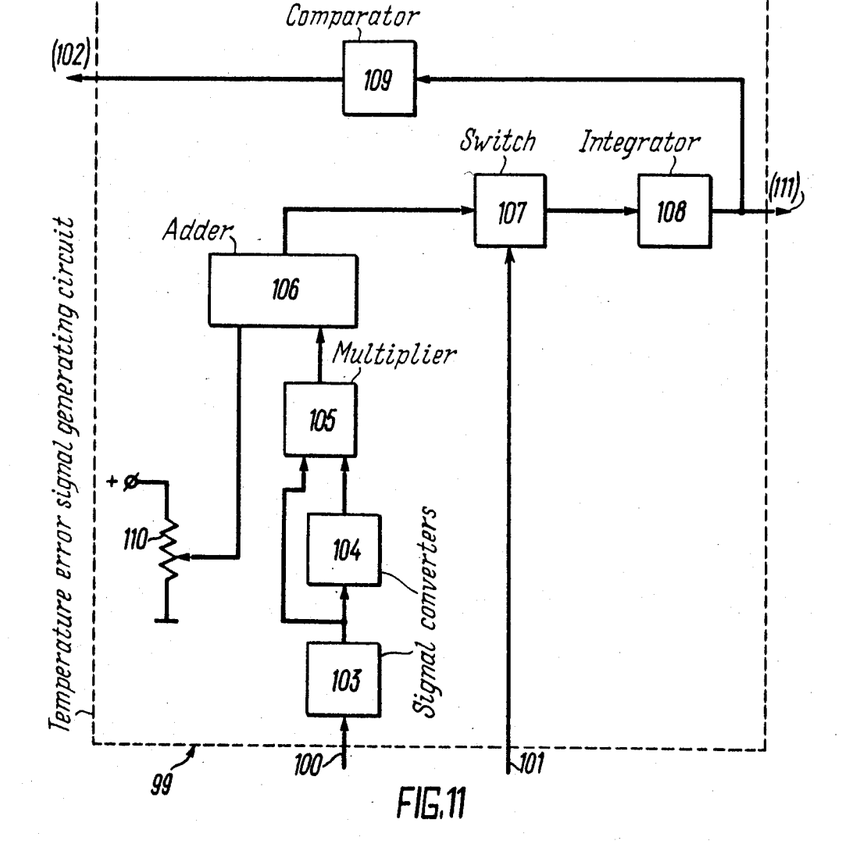
FIG. 11 is a block diagram of a circuit generating a thermal condition error signal, according to the invention.

The comparator 109 is designed to produce a signal indicating irregular thermal conditions.

The switch 107 is designed to switch off the signals simulating the welding speed and arc current, the last two components of the heat balance equation, when the signal indicating irregular welding conditions is produced.

In order to produce an optical signal indicative of the welder's actions in the process of training, particularly depending on the spark gap length, the angle of the welding electrode simulator 1, and the temperature conditions of the simulated welding process, the welding electrode simulator 1 is provided with a light source 111 (FIG. 12) whose light flux is directed via a light conduit 112 to a surface 113 of the simulated welding object or workpiece. The output signal of the integrator 108 is supplied to the light source 111, and controls the magnitude of the light flux. The spot of light produced thereby simulates a round welding bath on the surface of the welding field unit in the area of the spark discharge.

The welding electrode simulator 1, operates as a stick electrode, comprises a holder 114 of an electrode 115, a frame 116 (FIG. 13), an angle sensor 55 (FIG. 12), a drive 117 (FIGS. 12 and 13) simulating the burn-off of the electrode 115, a metal tip 118 at the end of the frame 116, which is connected by means of a high-voltage cable 119 to one of the outputs of the electric spark generator 2 (FIG. 1). The welding electrode simulator 1 also comprises a dielectric ring 120. The metal tip 118 is hollow, and one end of the light conduit 112 is secured therein. The other end of the light conduit 112 is optically connected to the light source 111 and rigidly secured, together with this source 111, inside the hollow holder 114 of the electrode 115.

Figures 12, 13:
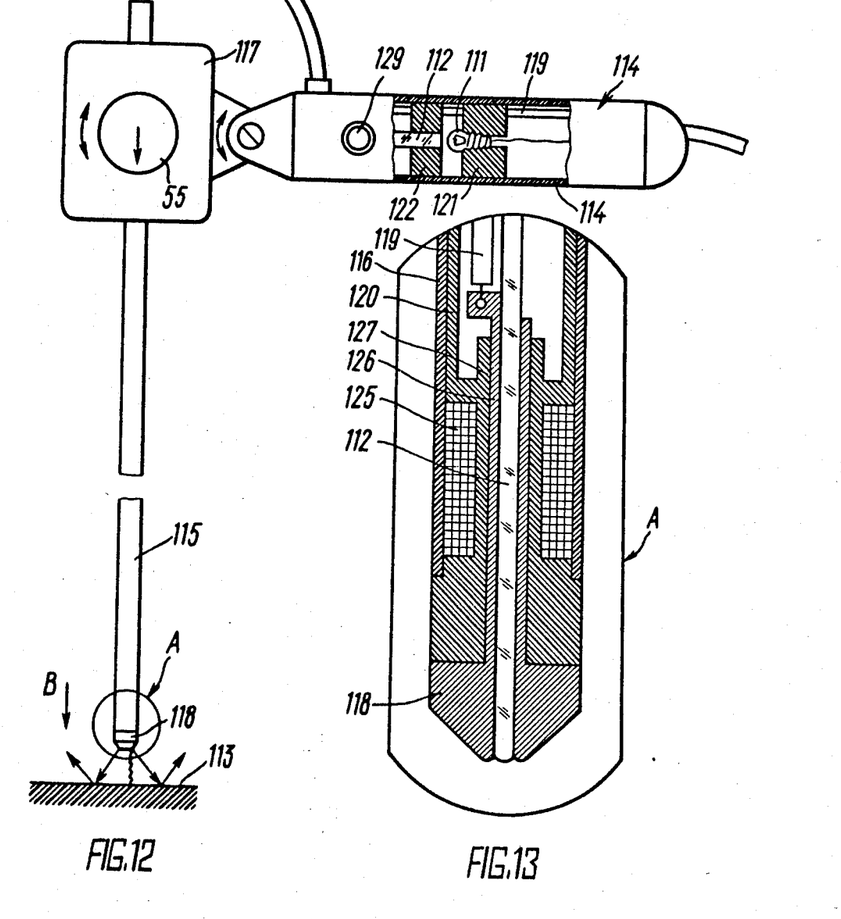
FIG. 12 is a welding electrode simulator featuring a light source, according to the invention.
FIG. 13 is an enlarged view of the unit A of the welding electrode simulator, according to the invention.

The output of the integrator 108, which is the output of the circuit 99 and which calculates a signal representing the content of the welding bath on the basis of the thermal parameters of the simulated workpieces, is connected to the light source 111. The light source 111 is fixed in a dielectric ring 121, while the end of the light conduit 112 is fixed in a dielectric ring 122.

Figure 14:
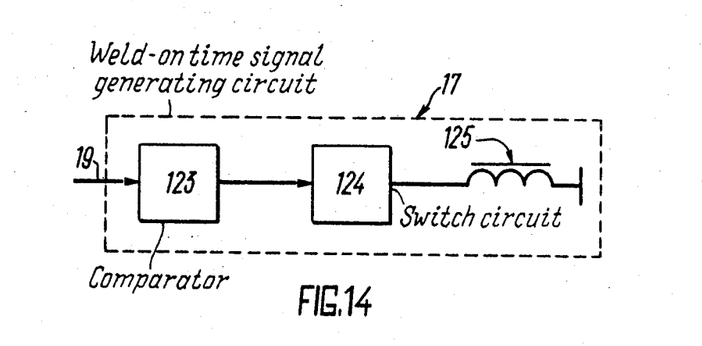
FIG. 14 is a block diagram of a circuit generating a signal representing the welding electrode simulator weld-on time, according to the invention.

Referring to FIG. 14, the circuit 17 generating a signal representing the weld-on time comprises a comparator 123 and a switch circuit 124, connected in series. The output of the switch circuit 124 is connected to a winding 125 of the electromagnet installed at the tip of the welding electrode simulator 1. The electromagnet comprises, apart from the winding 125, a core 126 and a frame 127 of the winding 125.

OPERATION

The spark trainer for welders, according to the invention, operates as follows.

Prior to operation all units and circuits of the spark trainer are set into the initial state.

The trainee takes the welding electrode simulator 1 into his right hand, puts on the helmet 10, and begins the simulated welding process. A thin sheet of conventional or electrographic paper is previously placed on the selected area of the welding field of the welding object simulation unit 4. The welding seam is drawn on the sheet of paper, and next to it is a path 128 (FIG. 5) of the tip of the electrode simulator 1 recorded by a skilled welder. Also prior to the beginning of the training process, welding conditions are set in the control unit 7, unit 5, and in the circuit 99. These conditions include the maximum duration of the training session, tolerances of the spark gap length, welding speed, angle of the electrode simulator 1, temperature of the welding bath, burn-off speed of the electrode simulator 1. All units and circuits are checked to be in the initial state.

The trainee has to move the tip of the electrode simulator 1 along the seam so that the path of the simulator tip is burned out on the paper sheet. Simultaneously, the burn-off of the electrode is simulated. The trainee has to maintain basic welding parameter, such as the arc gap length, the angle of the electrode simulator 1, the welding speed, and the temperature of the welding bath, within preset specific limits.

The trainee brings the electrode simulator 1 to the spot where the simulated welding process is to begin, keeps to the required arc gap length, maintains the required angle of the electrode simulator 1, and presses a button 129 (FIG. 12) of the switches 33, 70, and 72, available in the holder 114. Supply voltage is fed to the final stage, built around the transistor 60, of the amplifier 58. High voltage is produced at the metal tip 118 of the electrode simulator 1.

If the spark gap is not larger than 100 mm, a spark discharge is produced between the metal tip 118 and the metal spokes 21 (FIGS. 3, 4, 5) of the welding field unit, and the paper is burned through in that particular spot. The voltage at the output of the detector 50 (FIG. 7) is indicative of the length of the spark gap.

The current length of the spark gap is determined by measuring the current consumed by the final stage, built around the transistor 60 (FIG. 9), of the amplifier 58. This consumed circuit is a function of the spark gap length, the less the spark gap the larger the consumed current. The shorter the length of the spark gap maintained by the trainee the larger the output voltage of the detector 50, which corresponds to a greater heat input to the simulated weld. A certain voltage surge occurs at the output of the detector 50, when the spark discharge is initiated. This makes the comparator 15 (FIG. 7) respond, indicating the initiation of the simulated welding process. The comparator 15 controls the operation of the circuit 78 (FIG. 10) controlling the electrode burn-off simulation drive, and the circuit 99 is put into operation. Use of welding electrode is simulated in conjunction with a welding bath.

The optical "welding bath" is actually an optical feedback signal to the trainee, which tells him how he is doing is maintaining on an optimal level, the following welding parameters: the temperature of the welding bath, the length of the spark gap, and the angle of the electrode simulator 1. The brightness of the "welding bath" spot is the visual feedback signal indicating the heating degree of the welding bath. The light conduit 112 has a cone-shaped beam, and the optical "welding bath" varies in size with the length of the spark gap. This provides the trainee with a feedback signal indicating the correct length of the spark gap.

When the electrode simulator 1 deviates from the correct position in relation to the welding field unit, the optical "welding bath" changes its shape, from a circle to an ellipse, the larger diameter of the ellipse indicating the plane in which the electrode simulator 1 departed from the correct position. This is also a kind of optical feedback for the trainee to be able to maintain a correct angle of the electrode simulator 1.

When the button 120 is depressed, signals at the frequency of 1 Hz are supplied, concurrently with the above described process, from the generator 71 (FIG. 10) to the counter 96 of the welding time channel 77 and to the information inputs of the switch circuits 80, 82, and 83. If the trainee keeps the preset length of the spark gap, the assigned angle of the electrode simulator 1, the assigned welding speed, and the assigned temperature of the welding bath, a noise signal simulating a normal welding process is fed to the earphones of the helmet 10 from the generator 79.

The trainee moves the tip of the electrode simulator 1 along the simulated weld and marks the path by the spark discharge. The burnt-out path on the paper is the recorded evidence of the skill of the trainee in the course of the simulated welding process, by which his actions can be assessed as professional and correct, or otherwise.

The spark trainer, according to the invention, also provides a means for monitoring the speed of welding, which is the welding speed monitoring unit 13 (FIG. 6). To this end, the simulated welding process starts with the first metal spoke $21_1$ of the welding field unit and ends with the spoke $21_n$. When a high-voltage spark is excited on the first spark $21_1$, and the button 129 is pressed, the output signals of the circuit $35_1$ and the first digit of the register 32 initially coincide. No signal is therefore produced at the output of the circuit $34_1$ and OR gate 36. In the next instant, a shift pulse is fed from the oscillator 31 to the register 32, and the logical zero is shifted from the first position of the register 32 to the second position thereof. In order to prevent the signal representing irregular welding speed from being generated at the output of the circuit $34_2$, the trainee has to move the tip of the electrode simulator 1 normally to the metal spokes 21 and thus excite the high-voltage spark on the second spoke $21_2$. The process is then repeated as described above.

It can be said that there exists a certain balance between the welding process speed and the shift frequency, that is the frequency of the oscillator 31. When this balance is upset, a signal is produced at the outputs of the circuits 34 and, respectively, the circuit 36. This signal means that the preassigned welding speed is not observed. This welding speed can, therefore, be varied within a broad range by changing the frequency of the oscillator 31 to suit particular conditions of the simulated welding process.

Figure 8:
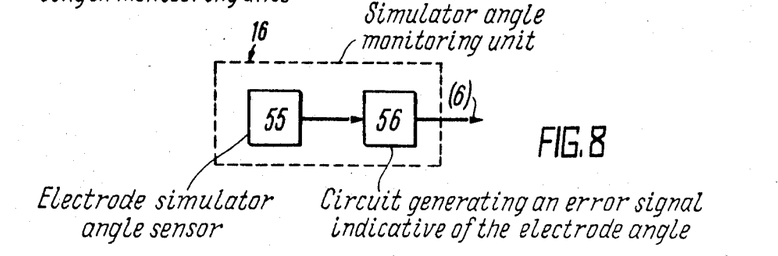
FIG. 8 is an angle monitoring unit, according to the invention.

The spark trainer, according to the invention, also provides for monitoring the angle of the electrode simulator 1. When the angle of the electrode simulator 1 exceeds the preassigned value, the angle sensor 55 is triggered into operation and generates a control signal applied to the input of the circuit 55, which, in turn, generates an error signal to be fed to the input of the switch circuit 81.

In case the trainee does not keep one or several welding parameters within the assigned limits in the course of the training process, error signals indicative of the basic parameters of the welding process are generated by the circuits 51, 56, and 99, and the unit 13, and applied to control inputs of respective switching circuits 80, 81, and 83 (FIG. 10). These signals permit pulses from the oscillator 71 to pass to the counting inputs of the error number counters 84, 85, 86, and 87. The indicators 92, 93, 94, and 95, are visual displays of the number of errors made.

When the duration of an error signal for any welding parameter is less than a second, this error is disregarded and is not recorded by the counters 84-87. When the error signal duration is much longer, the counters 84-87 receive a pulse each second and record a welding parameter being erroneous for a certain period of time. In this manner the skill of the trainee and the quality of the simulated welding process can be assessed on the basis of the readings of the indicators 92-95 and the welding time indicator 98.

Irregularities of the simulated welding process are also manifested by the audio generator 79 producing, apart from the welding noise signal, a series of tone signals having different frequencies, which are audio alarm signals of the main parameters of the simulated welding process applied to the earphones of the helmet 10. These signals are audible feedback signals for the trainee to understand how he is performing in maintaining the basic welding parameters.

When the spark gap is too short, which in real conditions means the electrode is welded on to the workpiece, the comparator 123 of the circuit 17 (FIG. 14) generating a signal representing the weld-on time of the electrode simulator 1 produces a signal fed to the switching circuit 124. Having received the signal, the circuit 124 feeds a control signal to the winding 125 located at the end of the electrode simulator 1 (FIG. 13). The metal tip 118 is strongly drawn to the metal spokes 21 of the welding field unit. The trainee has to exert considerable efforts to separate the electrode simulator 1 from the spokes 21. When the electrode simulator 1 is separated from the spokes 21, the winding 125 is deenergized.

To summarize, assessment of the training is done on the basis of the readings of the indicators 92, 93, 94, and 95, the number of errors in maintaining the length of the spark gap, the angle of the electrode simulator 1, the speed of welding, and the temperature of the welding bath, and, also, the recorded path of the tip of the electrode simulator 1, which is checked against the reference path recorded by a skilled welder.

The spark trainer for welders, according to the invention, offers the advantage of an integrated control over the operations of the trainee in all basic parameters of the simulated welding process. The trainer offers a broad range of types of welding in which instruction is possible. And, the last and the most important feature, the trainer provides feedback audio and optical signals for the trainee welder, which is a serious contribution to the efficiency and quality of training. The training period can be substantially cut down.

What is claimed is:

1. A spark trainer for welders, comprising:
   a welding electrode simulator;
   an electric spark generator which simulates the welding arc and has an output; said output being connected to said welding electrode simulator;
   a welding object simulation unit, a spark discharge simulating the welding arc being produced between said welding object simulation unit and the tip of said welding electrode simulator, said welding object simulation unit comprising a simulated welding object having a surface along which the simulated welding process is performed;
   a unit for monitoring the position of the tip of said welding electrode simulator wiht respect to said simulated welding object, which has outputs;
   a training process control unit having an input, a first output, and a second output, said input of said control unit, connected to said outputs of said unit for monitoring the position of the tip of said welding electrode simulator; said first output of said control unit, connected to said welding electrode simulator;
   a helmet provided with earphones and connected to said second output of said control unit in order to supply to the welder audio signals indicative of the position of the tip of said welding electrode simulator with respect to said simulated welding object.

2. A spark trainer for welders as claimed in claim 1, wherein said unit for monitoring the position of the tip of said welding electrode simulator with respect to said simulated welding object comprises:
   a welding speed monitoring unit having an output connected to said input of said control unit;
   a unir for monitoring the current length of the spark gap, which has a first output and a second output; said first output of said spark gap current length monitoring unit, connected to said input of said control unit;

a circuit generating a signal representing the simulated welding process, having an input and an output; said input of said signal generating circuit, connected to the second output of said spark gap current length monitoring unit; said output of said signal generating circuit, connected to said input of said control unit;

a unit for monitoring the angle between said welding electrode simulator and the normal to said surface of said simulated welding object, which has an output connected to said input of said control unit;

a circuit generating a signal representing the time during which said welding electrode simulator is welded on to said surface of said simulated welding object, having an input connected to said second output of said spark gap current length monitoring unit, and an output connected to said welding electrode simulator.

3. A spark trainer for welders as claimed in claim 2, wherein said spark gap current length monitoring unit comprises:

a detector having an input connected to said output of said electric spark generator, and a circuit generating an error signal indicative of the length of the spark gap, having an input connected to said output of said detector.

4. A spark trainer for welders as claimed in claim 3, wherein said electric spark generator comprises a master pulse oscillator and an amplifier, which are connected in series, said amplifier having an output connected to said input of said detector.

5. A spark trainer for welders as claimed in claim 2, wherein said circuit generating a signal representing the simulated welding process is made as a first comparator connected to said output of said spark gap current length monitoring unit.

6. A spark trainer for welders as claimed in claim 2, wherein said unit for monitoring the angle between said welding electrode simulator and the normal to said surface of said simulated welding object comprises:

an electrode angle sensor located on said welding electrode simulator and having an output, and a circuit generating an error signal indicative of the electrode angle, having an input and electrically connected to said output of said electrode angle sensor; said circuit being a second comparator.

7. A spark trainer for welders as claimed in claim 2, wherein said training process control unit comprises:

pulse oscillator having an output;

a channel of the spark gap length, having a first input connected to said output of said pulse oscillator, and a second input connected to said output of said spark gap current length monitoring unit;

a channel of the tilt angle of said welding electrode simulator, having a first input connected to said output of said pulse oscillator, and a second input connected to said output of said electrode angle monitoring unit;

a channel of the temperature conditions of the simulated welding process, having a first input connected to said output of said pulse oscillator, and a second input;

a channel of the speed of the simulated welding process, having a first input connected to said output of said pulse oscillator, and a second input connected to said output of said welding speed monitoring unit;

a channel of the working time of the simulated welding process, having an input connected to said output of said pulse oscillator;

a circuit controlling a drive simulating the burn-off of the welding electrode, having an input connected to said output of said circuit generating a signal representing the simulated welding process, and an output connected to said welding electrode simulator;

an audio generator of alarm signals and audio accompaniment, having an output connected to said input of said spark gap current length monitoring unit, to said input of said electrode angle monitoring unit, to said input of said welding speed monitoring unit, and to said helmet.

8. A spark trainer for welders as claimed in claim 7, which comprises a circuit generating an error signal indicative of the temperature conditions of the simulated welding process, having a first input connected to said spark gap current length monitoring unit, a second input connected to said output of said circuit generating a signal representing the simulated welding process, and an output connected to said second input of said channel of the temperature conditions of the simulated welding process;

said circuit generating an error signal indicative of the temperature conditions of the simulated welding process, comprising:

a first converter of a signal representing the length of the spark gap, having an input and an output;

a second converter of a signal representing the arc current, having an input connected to said output of the first converter, and an output;

a multiplier having a first input connected to said output of said first converter, a second input connected to said output of said second converter, and an output;

an adder having a first input connected to said output of said multiplier, a second input, and an output;

a welding speed setting circuit connected to said second input of said adder;

a switch having an input connected to said output of aid adder, a control input connected to said output of said circuit generating a signal representing the simulated welding process, and an output;

an integrator having an input connected to said output of said switch, and an output;

a fourth comparator having an input connected to said output of said integrator, and an output which is said output of said circuit generating an error signal indicative of the temperature conditions of the simulated welding process.

9. A spark trainer as claimed in claim 8, wherein said welding electrode simulator is provided with a light source emitting a light flux onto said surface of said simulated welding object and electrically connected to said output of said integrator in order to simulate a welding bath and produce an optical signal characterizing the welder's actions in the process of training.

10. A spark trainer for welders as claimed in claim 7, comprising a circuit generating an error signal indicative of the temperature conditions of the simulated welding process, having a first input connected to said spark gap current length monitoring unit, a seciond input connected to said output of said circuit generating a signal representing the simulated welding process, and a output connected to said second input of said channel of the temperature conditions of the simulated welding process of said control unit; said circuit generating an error signal indicative of the temperature conditions of the simulated welding process, which comprises:
- a first converter of the signal representing the length of the spark gap, having an input and an output;
- a second converter of the signal representing the arc current, having an input connected to said output of the first signal converter, and an output;
- a multiplier having a first input connected to said output of said first signal converter, a second input connected to said output of said second signal converter, and an output;
- an adder having a first input connected to said output of said multiplier, a second input, and an output;
- a welding speed setting unit connected to said second input of said adder;
- a switch having an input connected to said output of said adder, a control input connected to said output of said circuit generating a signal representing the simulated welding process, and an output;
- an integrator having an input connected to said output of said switch, and an output;
- a fourth comparator having an input connected to said output of said integrator, and an output which is said output of said circuit generating an error signal indicative of the temperature conditions.

11. A spark trainer for welders as claimed in claim 2, wherein said circuit generating a signal representing the weld-on time, comprises an electromagnet with a winding and several series-connected components, such as a third comparator, a switch circuit, and said winding of said electromagnet installed at the end of said welding electrode simulator.

12. A spark trainer for welders as claimed in claim 2, wherein said welding object simulation unit comprises a welding field unit made as a set of metal spokes arranged parallel to said surface of said simulated welding object and rigidly secured thereon perpendicular to the welding direction; the number of said metal spokes being selected in accordance with the size of said surface of said simulated welding object and the desired accuracy of monitoring the position of the tip of said welding electrode simulator.

13. A spark trainer for welders as claimed in claim 10, wherein said welding speed monitoring unit comprises:
- a timing pulse oscillator having an output;
- a register having an input connected to said output of said timing pulse oscillator, and a plurality of outputs; matching elements whose number corresponds to the number of said metal spokes from said set, each said matching element having an input connected to one said metal spoke from said set of spokes, and an output;
- coincidence circuits, each having a first input connected to said respective output of said register from said plurality of outputs, a second input connected to said output of said respective matching element, and an output;
- an OR circuit having a plurality of inputs, each said input being connected to said output of respective said coincidence circuit, and an output which is said output of said welding speed monitoring unit.

14. A spark trainer for welders as claimed in claim 2, wherein said spark gap current length monitoring unit comprises:
- a detector having an input connected to said output of said electric spark generator, and a circuit generating an error signal indicative of the length of the spark gap, having an input connected to said output of said detector;
- said circuit generating a signal representing the simulated welding process, which is a first comparator connected to said output of said spark gap current length monitoring unit;
- said unit for monitoring the angle between said welding electrode simulator and the perpendicular to said surface of said simulated welding object, comprising: an electrode angle sensor located on said welding electrode simulator and having an output, and a circuit generating an error signal indicative of the electrode tilt angle, having an input and electrically connected to said output of said electrode angle sensor, said error signal generating circuit being a second comparator;
- said circuit generating a signal representing the electrode weld-on time, comprises an electromagnet equipped with a winding and, connected in series, a third comparator, a switch circuit, and said winding of said electromagnet installed at the end of said welding electrode simulator;
- said welding speed monitoring unit comprises: a timing pulse oscillator having an output; a register having an input connected to said output of said timing pulse oscillator, and a plurality of outputs; matching elements whose number corresponds to that of said metal spokes from said set of spokes, each said matching element having an input connected to one said metal spoke from said set of spokes, and an output; coincidence circuits, each having a first input connected to respective output of said register from said plurality of outputs, a second input connected to said output of the respective matching element, and an output; an OR gate having a plurality of inputs, each such input being connected to said output of the respective coincidence circuit, and an output which is said output of said welding speed monitoring unit.

15. A spark trainer for welders as claimed in claim 14, comprising a circuit generating an error signal indicative of the temperature conditions of the simulated welding process, having a first input connected to said spark gap current length monitoring unit, a second input connected to said output of said circuit generating a signal representing the simulated welding process, and an output connected to said second input of said channel of the temperature conditions of said control unit; said circuit generating an error signal indicative of the temperature conditions of the simulated welding process, comprising:
- a first converter of the signal representing the length of the arc gap, having an input and an output;
- a second converter of the signal representing the arc current, having an input connected to said output of said first signal converter, and an output;
- a multiplier having a first input connected to said output of said first signal converter, a second input connected to said output of said second signal converter, and an output;
- an adder having a first input connected to said output of said multiplier, a second input, and an output;
- a welding speed setting circuit connected to said second input of said adder;

a switch having an input connected to said output of said adder, a control input connected to said output of said circuit generating a signal representing the simulated welding process, and an output;

an integrator having an input connected to said output of said switch, and an output;

a fourth comparator having an input connected to said output of said integrator, and an output which is the output of said circuit generating an error signal indicative of the temperature conditions of the simulated welding process.

16. A spark trainer for welders as claimed in claim 1, wherein said welding object simulation unit comprises a welding field unit made as a set of metal spokes arranged parallel to said surface of said simulated welding object and rigidly secured on said surface perpendicular to the direction of welding; the number of said metal spokes being selected in accordance with the size of the said surface of said simulated welding object and the desired accuracy of monitoring the position of the tip of said welding electrode simulator.

17. A spark trainer for welders, comprising:

a welding electrode simulator;

an electric spark generator simulating the welding arc and having an output; said output connected to said welding electrode simulator;

a training process control unit having an input, a first output, and a second output; said first output connected to said welding electrode simulator;

a welding object simulation unit, a spark discharge simulating the welding arc being produced between said welding object simulation unit and the tip of said welding electrode simulator; said welding object simulation unit comprising: a simulated welding object having a surface along which the simulated welding process is performed; a welding field unit made as set of metal spokes arranged parallel to said surface of said simulated welding object and rigidly secured thereon perpendicular to the welding direction, the number of said metal spokes being selected in accordance with the size of said surface of said simulated welding object and the desired accuracy of monitoring of the position of the tip of said welding electrode simulator;

a unit for monitoring the position of the tip of said welding electrode simulator with respect to said simulated welding object, comprising: a welding speed monitoring unit having an output; a spark gap current length monitoring unit having a first output and a second output; a circuit generating a signal representing the simulated welding process, having an input and an output; said input of said signal generating circuit, connected to the second output of said spark gap current length monitoring unit; said output of said signal generating circuit, connected to said input of said control unit; a unit for monitoring the angle between said welding electrode simulator and the perpendicular to said surface of said simulated welding object, having an output; a circuit generating a signal representing the time during which said welding electrode simulator is welded on to said surface of said simulated welding object, having an input connected to said second output of said unit for monitoring the current length of the spark gap, and an output connected to said welding electrode simulator;

said training process control unit comprising: a pulse oscillator having an output; a channel of the spark gap length, having a first input connected to said output of said pulse oscillator, and a second input connected to said first output of said spark gap current length monitoring unit; a channel of the tilt angle of said welding electrode simulator, having a first input connected to said output of said pulse oscillator, and a second input connected to said output of said electrode tilt angle monitoring unit; a channel of the temperature conditions of the simulated welding process, having a first input connected to said output of said pulse oscilator, and a second input; a channel of the speed of simulated welding process, having a first input connected to said output of said pulse oscillator, and a second input connected to said output of said welding speed monitoring unit; a channel of the working time of the simulated welding process, having an input connected to said output of said pulse oscillator; a circuit for controlling the welding electrode burn-off simulation drive, having an input connected to said output of said circuit generating a signal representing the simulated welding process, and an output connected to said welding electrode simulator;

an audio generator of alarm signals and audio accompaniment, having an output connected to said input of said spark gap current length monitoring unit, to said input of said electrode angle monitoring unit, and to said input of said welding speed monitoring unit;

a helmet equipped with earphones and connected to said output of said audio generator in order to supply to the welder audio signals indicative of the position of the tip of said welding electrode simulator with respect to said simulated welding object.

* * * * *